3,073,454
Patented Jan. 15, 1963

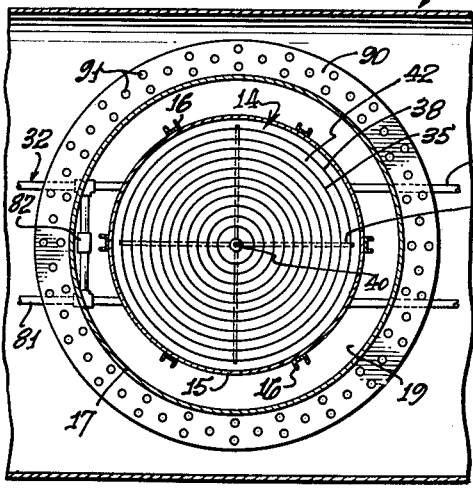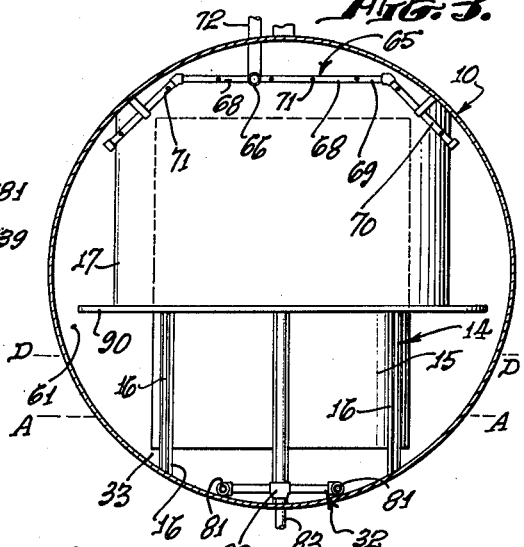

3,073,454
APPARATUS FOR SEPARATION OF DISPERSIONS
Logan C. Waterman, Houston, and Ernest A. Cole, Jr., Bellaire, Tex., assignors to Petrolite Corporation, Wilmington, Del., a corporation of Delaware
Filed Aug. 6, 1959, Ser. No. 832,109
6 Claims. (Cl. 210—243)

Our invention relates to the separating of dispersions, including emulsions, and more particularly to the separating of those dispersions in which an oil is the continuous phase and a heavier material is dispersed therein in particulate form.

The invention involves a unique and versatile separating apparatus by which dispersions are separated in sequential zones within a closed horizontal container. It is an important object of the invention to subject the dispersion to a preliminary separating action while rising in an upright space occupying only a small proportion of the internal volume of the horizontal container, the residual dispersion being then further separated in a larger zone of the container. A further object is to effect such further separation while the residual dispersion is flowing in a direction having a large horizontal component of motion.

It is a further object of the invention to employ a separation-promoting means to assist the preliminary separation. At the same time, it is an object of the invention to provide an arrangement of chambers conducive to passable separation even if the separation-promoting means is of a type actively inducing coalescence and becomes inoperative through malfunctioning. In this respect it is often desirable to employ a separating apparatus connected on-stream with large oil-refinery equipment which would be seriously damaged if, through malfunctioning, no separation of the incoming dispersion was effected. At the same time, such subsequent equipment can usually tolerate for a time a partially-separated dispersion. It is a feature of the present invention that if an active separation-promoting means is employed and becomes inoperative, the equipment will continue to deliver a substantially purified oil.

Further objects and advantages of the invention will be apparent to those skilled in the art from the following description of exemplary embodiments, illustrated in the drawing, in which:

FIG. 1 is a vertical sectional view of one embodiment of the invention;

FIG. 2 is a horizontal sectional view taken along the line 2—2 of FIG. 1;

FIG. 3 is a vertical transverse sectional view taken along the line 3—3 of FIG. 1; and FIG. 4 is a vertical sectional view of an alternative embodiment of the invention.

The embodiment of FIG. 1 includes a large horizontal container 10 closed at its ends by heads 12, this container being much greater in horizontal length than in height, typically by a ratio of at least 1.5:1. In the preferred embodiment, the container 10 is a cylindrical pressure vessel.

Occupying only a small portion of the total internal volume of the container 10 is an upright preliminary separation chamber 14. Any suitable upright wall or enclosure can be employed to partition off a portion of the interior of the container 10 to form this separation chamber. In the preferred embodiment, the chamber is within a tubular member 15 shaped as a cylinder with its vertical axis at right angles to the horizontal axis of the container 10. The upright preliminary separation chamber 14 may be at or close to one end of the container 10 but is preferably centrally disposed therein.

Support members 16 are secured to the exterior of the tubular member 15 and protrude as arms from the top and bottom of the tubular member to support it in the position shown.

The invention employs a second upright wall spaced from the first upright wall formed by the tubular member 15. This second upright wall is shown as a cylindrical shroud 17 depending from the top wall of the container 10 and having an upper edge which conforms to the upper cylindrical segment of the container, being welded or otherwise secured in fluid tight relationship thereto. The space within the container 10 beyond the tubular member 15 and the shroud 17 constitutes two end zones 18 respectively at opposite ends of the container. Between the tubular member 15 and the shroud 17 is a large upright flow passage means 19 communicating at its upper end with the upper interior of the preliminary separation chamber 14 and providing at its lower end a large exudation orifice 20 opening on the end chambers 18 at a level that is within the lower half of the interior of the container 10.

Means is provided for flowing the dispersion upwardly in the preliminary separation chamber 14. A multi-orifice distributor 21 having perforated pipe arms 22 closed at their outer ends and radiating from a manifold 23 may be employed in this connection, the distributor being at a lower position in the tubular member 15. The manifold 23 is positioned at the upper end of a riser pipe 24 which extends from the container 10 to any suitable source of dispersion. Often the dispersion is produced by pumping streams of oil and aqueous or other oil-immiscible material through pipes 25 and 26 to a junction 27 and thence through a mixer 28 connected to the pipe 24, pumps 29 and 30 respectively pressuring the streams and delivering the resulting dispersion to the interior of the tubular member 15 at superatmospheric pressure.

The distributor 21 tends to break up the stream of dispersion into a plurality of smaller streams distributed throughout the horizontal cross-section of the preliminary separating chamber 14, these streams ultimately joining into a larger stream rising slowly in this chamber as indicated by the arrows 30a. The dispersion is subjected to gravitational forces during this slow upward movement and some of the heavier material will drop therefrom into the lower interior of the container 10. As shown, the support members 16 position the tubular member 15 to leave a space 33 between the lower edge of the tubular member and the bottom wall of the container 10, this space interconnecting the lower interiors of the two end zones 18. Bodies 31 of heavier material collect in the lower interiors of these end zones, being withdrawn through a heavier material effluent pipe means 32, later described, at such rate as to maintain the level or surfaces of the bodies 31 in a predetermined position, for example as indicated by the line A—A of FIG. 1. This level will usually be slightly above the lowermost edge of the tubular member 15. Substantially the same level will exist inside the tubular member 15. The separated heavy material thus forms a liquid seal between the inside and outside of the tubular member 15 because this member dips into the separated heavier material so that columns of this liquid are respectively inside and outside the tubular member. This prevents oil-continuous material from flowing from the lower end of the tubular member.

Any suitable separation-promoting means may be employed in the upright separation chamber 14 to better the preliminary separation which takes place therein. For example, FIG. 1 shows a grid of spaced upright flow-straightening members made of sheet material, including members 35 of an upper set depending from a framework 36 supported by brackets 37 and members 38 supported by a framework 39 hung from a rod 40 which extends upward into a housing 41. In the embodiment shown the members 35 and 38 are cylindrical, the members 38 bisecting the spaces between the members 35, forming passages 42 through which the rising dispersion flows. The members 35 and 38 tend to damp out turbulence or lateral components of motion in the rising stream, giving a better opportunity for the solid material to settle from the resulting substantially laminar streams between these members.

If desired, electric fields can be established in the spaces 42 between the members 35 and 38 to induce further coalescence of the particles of the heavier material, such coalescence producing larger masses which settle more readily against the rising stream of the incoming dispersion. If such electric fields are to be established in the spaces 42, the rod 40 may be suspended from an insulator 44 in the housing 41 and energized from a source of potential 45 through a high voltage lead 46 which may extend through a suitable bushing 47 and be connected to the rod 40 to maintain the members 38 at this high voltage. The members 35 may be connected to the other terminal of the source 45 through ground. Unidirectional voltage gradients of 2,000-6,000 volts per inch are commonly employed. Other types of members can be employed as electrodes within the preliminary separation chamber 14.

The separation-promoting means in the upright separation chamber 14 may include also a means for washing the incoming dispersion by channeling it through a body of water or a body of the heavier material already separated from the dispersion. This type of operation will be more fully explained with reference to FIG. 4 but can be effected in the equipment of FIG. 1 by controlling the outflow of the heavier material to raise the level of the bodies 31 to a position D—D above the distributor 21. The streams issuing from the perforations of the distributor will then be discharged into such a body to be washed thereby in a manner to promote the separation of heavier material therefrom.

The uppermost end of the tubular member 15 is preferably in a horizontal plane spaced below the upper interior wall of the container 10, providing a space through which the upper interior of the chamber 14 communicates with the upper interior of the upright flow passage 19. Such uppermost end is in the form of an edge acting as a dam over which flows the residual dispersion or partially purified oil resulting from the preliminary separation in the chamber 14. We prefer to provide a circular flange member 51 extending inwardly from the upper end of the tubular member 15 a slight distance, guiding the residual dispersion to flow through a large circular opening 53 of slightly smaller area than the upper end of the tubular member 15. This tends to equalize more nearly the upward flows in the various annular spaces 42 between the members 35 and 38, particularly if the space between the outermost member 38 and the tubular member 15 is somewhat larger than the other spaces 42 as may be the case. The residual dispersion rising through the opening 53 turns and flows downward through the passage 19. Another function of the flange 51 is to enlarge the turn path and thus tend to avoid such turbulence in the turn as might further mix the dispersion.

The residual dispersion exudes from the large orifice 20, preferably at a position below the horizontal midsectional plane of the container 10. The exudation orifice preferably faces downwardly. The lower end of the shroud 17 is preferably in a horizontal plane and, as best shown in FIG. 3, is correspondingly spaced varying distances from the internal cylindrical surface of the container 10, providing a varying-width passage 61 (FIG. 3) which distributes the residual dispersion into the two end zones 18 in a manner conducive to the best separation therein.

The exudation orifice 20 is of relatively large width and cross-sectional area. For example, the shroud 17 is desirably of a diameter at least about one-half the diameter of the container 10, the width of the orifice 20 being sufficient to cause the residual dispersion to exude or ooze slowly therefrom, as distinct from being jetted downwardly in the end zone with a large vertical component of motion sufficient to carry same to or into the bodies of separated heavier material 31 below the level A—A. Commonly, the orifice 20 is of a width of several inches to avoid such jetting even at relatively large throughputs. By having the residual dispersion exude slowly from the orifice 20 and flow smoothly across the dam-like lower edge of the shroud 17 it will follow flow paths in the end zones determined largely by pressure differences, as distinct from momentum.

It has been found that a much improved settling action takes place in the end zones 18 if the residual dispersion is caused to move therein as tranquil streams flowing in inclined paths from the exudation orifice 20 toward the upper interiors of the end zones. Stated in other words, it is desirable that the residual dispersion be made to flow in a direction away from the upright separation chamber 14 and lengthwise of the container in each end zone, by which we have reference to a movement of the residual dispersion in such direction as to have a large horizontal component of motion. This not only spreads the residual dispersion throughout the end zone but prolongs the flow paths, giving additional time for the heavier material to settle to the bodies 31.

The preferred manner of obtaining such movement of the residual dispersion lengthwise of the container in the end zones 18 is to employ a suitable oil effluent pipe means 65 opening on the upper interior of each end zone at a position or positions sufficiently far removed from the orifice 20 to establish such flow. The oil effluent pipe means 65 preferably includes an oil collector having a plurality of orifices spaced from each other lengthwise of the container and thus spaced different distances from the orifice 20. As shown, the structure includes a longitudinal pipe 66 traversing the end zones 18 and the upper interior of the shroud 17, this pipe being equipped with a plurality of pipe arms 68 distributed throughout the corresponding end zone. Each pipe arm includes obtuse sections 69 and 70 having horizontally facing orifices 71 distributed along the length thereof. The pipe 66 acts as a manifold to collect the influents of the orifices 71, discharging the composite stream through a riser pipe 72 as controlled by a valve 73.

It is desirable that the orifices 71 be arranged in several series extending longitudinally of the container wherefore some of the streams, indicated generally by the numeral 75, angle upwardly more sharply then others and whereby a generally outward or lengthwise flow in the end zones is induced. By distributing the orifices 71 so that some are at the extreme ends of the end zones, the flow pattern is particularly advantageous and the entire horizontal cross-sectional area of the end zones can be made available for separation even though the exudation orifice 20 is localized near the center of the container. Best results are obtained if the longitudinal series of orifices in each end zone are arranged so that at least one series is on each side of the vertical longitudinal midplane of the zone. In this way the orifices in each longitudinal series are spaced from each other lengthwise of the container while the orifices of adjacent series are spaced from each other laterally of the container to produce a pattern causing the residual dispersion to spread over substantially the entire horizontal cross-sectional area of the end zones.

Additional dispersed or heavier material separates from the stream 75 as indicated by the arrows 77. This material settles to the bodies 31 below the level A—A and becomes a part thereof. The manner of withdrawing the heavier material from such bodies can be made to augment the generally lengthwise flow of the residual dispersion by designing the heavier material effluent pipe means 32 to intake at positions removed outwardly from the vicinity of the orifice 29, producing a generally outward flow in each body 31 as indicated by the arrow 78. As shown, the heavier material effluent pipe means 32 includes a collector made of open-ended horizontal pipes 81 on opposite sides of the midplane of the end zones, these pipes intaking exclusively through their open ends. Such influent is manifolded and collected in a T 82, being withdrawn through a pipe 83 under the control of a valve 84.

Another way of augmenting the flow of residual dispersion lengthwise of the end zones is to employ an outwardly-extending flange 90 at the bottom of the shroud 17 equipped with openings 91. The orifice 20 discharges the residual dispersion beneath this flange and while some portions may rise through the openings 91, other portions will be guided outwardly beneath the flange toward more distant portions of the end zone.

In the embodiment of FIG. 4 the separation-promoting means includes means for maintaining in the upright preliminary separation chamber 14 a rather deep body of wash medium 100 extending to a level 101 considerably above the distributor 21, which is here placed at a level somewhat lower than in FIGURE 1. Any suitable means is employed to control the level 101. FIG. 4 shows diagrammatically, an arrangement, also useful in the embodiment of FIG. 1, including a float 103 of a density to be buoyant in the body 100 but to sink in the dispersion above the level 101. This float is attached to a rod 104 guided at 105 and carrying a valve member 106 at its lower end adapted to move toward and away from a seat 107. If the level 101 drops, the float 103 lowers and restricts the effluent flow through the pipe 107 and vice versa. The body 100 is being continuously augmented by the heavier material of the dispersion which is removed during channeling upward through the deep body 100. In this embodiment, the tubular member 15 extends completely to the bottom of the container 10, being connected thereto in fluid-tight relationship. The seal between the inside and outside of the tubular member 15 is thus a fixed one, as compared with the liquid seal in the embodiment of FIG. 1.

An additional feature of FIG. 4 is that the flange 90 at the end of the shroud 17 is here extended a further distance into the end zones to assist in distributing the residual dispersion and causing it to advance longitudinally of the end zone. It is quite practical to extend the flange 90 a distance of 18 inches or more into the end zone.

With the arrangement of FIG. 4 it is usually desirable to maintain the level of the bodies 31 above the flange 90, e.g. at a level E—E. The residual dispersion is then exuded into the bodies 31 and is washed therein before the oil can rise through the openings 91 of the flange or at positions beyond the flange. In this way the dispersion to be treated can be subjected to a dual washing action, one in the preliminary separation chamber 14 and the other in the end zones 18.

An example of the operation of the invention will be given with reference to a process in which a 47° Bé. hydrofined distillate is caustic washed by use of an aqueous caustic solution of a strength of about 33–35° Bé. About 10% of this caustic solution was mixed with the distillate in the mixer 28 and was resolved at a rate of about 6,000 barrels per day in a separator of the type of FIG. 1 except that no flange 90 was present. With a unidirectional voltage gradient of about 7,000 volts per inch in the spaces 42 and with an arrangement of orifices 71 as suggested in FIGS. 1 and 3, the separated effluent oil contained an average of only .005% or less of residual heavier material. The separated heavier material was withdrawn from the bottom of the container in a clear state. In the absence of the electric fields, other conditions remaining the same, the dispersion could still be resolved or separated to a passable extent, the effluent oil containing no more than a few tenths of a percent of residual dispersed material, depending upon the particular oil being treated. These results are typical of a settler of the type of FIGS. 1–3 in which the cylindrical container 10 is about 12 ft. in diameter and about 24 ft. in overall length, the tubular member 15 being of a diameter of about 8.5 ft. with its lower edge terminating about 1 foot below the horizontal midplane of the container.

With more easily separable dispersions or with a lesser degree of mixing, the apparatus of the invention can be employed without electric fields or other aids within the preliminary separation chamber 14. With many dispersions, the action of gravity alone in the various chambers will produce the desired degree of separation. In other instances, separation-promoting means such as the grid of spaced upright flow-straightening members of FIG. 1 or the deep wash of FIG. 4 can be employed.

Various changes can be made without departing from the spirit of the invention as defined in the appended claims.

We claim as our invention:

1. Apparatus for separating dispersions of oil and a heavier material dispersed therein, said apparatus including: a tubular container closed at its ends by heads and having a central longitudinal axis extending horizontally and of a length at least about 1.5 times the height of said container measured vertically and at right angles to said longitudinal axis, said tubular container providing uppermost and lowermost walls; an upright tubular enclosure within said container occupying only a small portion of the total internal volume of said container, an upright preliminary separation chamber being formed within said enclosure, there being end zones within said container between said upright enclosure and the respective heads of said container; means for fixedly supporting said tubular enclosure in said container with its lower end above said lowermost wall in open communication with the lower interiors of both said end zones and its upper end spaced below the uppermost wall of the container; means for flowing the dispersion upward in said preliminary separation chamber, said last-named means comprising a multi-orifice dispersion distributor having orifices disposed in a horizontal plane at a lower position in said prelminary separation chamber and means for supplying the dispersion thereto; a shroud depending from said uppermost wall of said tubular container around and spaced from said upright enclosure providing therebetween an upright passage means openly communicating with the upper interior of said preliminary separation chamber through the space between the top of said upright enclosure and said uppermost wall of said tubular container, said upright passage means providing at its lower end an exudation orifice opening to each of said end zones near said upright enclosure to deliver thereto residual dispersion for further separation; an oil effluent pipe means opening on the upper interiors of said end zones at positions outwardly beyond said exudation orifice to establish flows of residual dispersion in the respective end zones away from said upright enclosure, additional dispersed material settling from the residual dispersion during such flows to form a body of heavier material in the lower interior of each end zone; and a heavy material effluent means for withdrawing from said bodies thereof the heavy material settling both in said upright preliminary separation chamber and in said end zones.

2. Separating apparatus as defined in claim 1 including separation-promoting means in said upright preliminary separation chamber comprising a grid of spaced upright concentric flow-straightening members within said upright chamber at a level between said dispersion distributor and the upper interior of said upright chamber, the spaces between said concentric members occupying substantially the entire cross section of said upright chamber.

3. Separating apparatus as defined in claim 1 including means to adjust the level of said heavy material which settles in the lower interior of said container so that the lower end of said tubular enclosure extends into said heavy material in the lower interior of said container to provide columns of said heavy material respectively inside said tubular member and outside thereof in said end zones forming a liquid seal between the inside and outside of said tubular enclosure at the bottom thereof.

4. Separating apparatus as claimed in claim 1 including means for establishing high-voltage electric fields within said upright tubular enclosure.

5. Apparatus for separating dispersions of oil and heavier material dispersed therein, said apparatus including: a closed-ended horizontal cylindrical container of an overall horizontal length at least about 1.5 times its diameter; an inner tubular member of cylindrical shape within said cylindrical container occupying only a small portion of the total internal volume of said container and fixedly mounted with its axis upright and perpendicular to the horizontal axis of said container and its upper end spaced below the uppermost wall of said cylindrical container, an upright preliminary separation chamber being formed within said inner tubular member; an outer tubular member comprising a cylindrical shroud having an upper end shaped to conform to the upper internal surface of said cylindrical container and connected thereto in substantially fluid tight relationship, said shroud depending around but being spaced from the periphery of said inner tubular member to define therebetween an upright annular passage openly communicating at its upper end with the upper interior of said preliminary separation chamber through the space between the top of said inner tubular member and said upper internal surface, the lower end of said upright annular passage comprising an exudation orifice positioned in the lower half of the interior of said container and opening on two end zones of the container between said tubular member and the respective ends of said container; means for preliminarily separating said dispersion in said preliminary separation chamber comprising means for flowing the dispersion upward therein, said last-named means including a multi-orifice dispersion distributor near the lower end of said chamber with its orifices disposed in a horizontal plane within said chamber and means for delivering the dispersion thereto, a residual dispersion flowing through said space to the top of and through said upright annular passage and thence into said end zones for further separation; a lighter-material withdrawal means withdrawing separated lighter material from the upper interior of said end zones; and a heavier-material withdrawal means withdrawing separated heavier material both from the lower interior of said inner tubular member and from the lower interiors of said end zones.

6. Separation apparatus as defined in claim 5 in which the lower end of said tubular member conforms in shape to said lowermost wall of said tubular container and is secured thereto.

References Cited in the file of this patent
UNITED STATES PATENTS

| | | |
|---|---|---|
| 1,440,832 | Jones | Jan. 2, 1923 |
| 1,781,076 | Palmer | Nov. 11, 1930 |
| 2,084,958 | Hunter | June 22, 1937 |
| 2,179,131 | Millard | Nov. 7, 1939 |
| 2,232,709 | Luetgert | Feb. 25, 1941 |
| 2,621,157 | D'Aliberti | Dec. 9, 1952 |